(12) United States Patent
Kondo (10) Patent No.: US 8,406,949 B2
(45) Date of Patent: Mar. 26, 2013

(54) TRAVEL CONTROL DEVICE FOR UNMANNED CONVEYANCE VEHICLE

(75) Inventor: Jun Kondo, Kariya (JP)

(73) Assignee: Toyota Shatai Kabushiki Kaisha (JP)

( * ) Notice: Subject to any disclaimer, the term of this patent is extended or adjusted under 35 U.S.C. 154(b) by 229 days.

(21) Appl. No.: 13/062,386

(22) PCT Filed: Mar. 12, 2010

(86) PCT No.: PCT/JP2010/054179
§ 371 (c)(1), (2), (4) Date: Mar. 4, 2011

(87) PCT Pub. No.: WO2010/150579
PCT Pub. Date: Dec. 29, 2010

(65) Prior Publication Data
US 2011/0160949 A1    Jun. 30, 2011

(30) Foreign Application Priority Data

Jun. 26, 2009    (JP) ................................ 2009-152529

(51) Int. Cl.
*G05D 1/00* (2006.01)
(52) U.S. Cl. .......................................................... 701/23
(58) Field of Classification Search ............... 701/23; 340/436
See application file for complete search history.

(56) References Cited

U.S. PATENT DOCUMENTS 4,613,804 A * 9/1986 Swenson ........................ 318/587

(Continued)

FOREIGN PATENT DOCUMENTS

| JP | 63-147206 A | 6/1988 |
|---|---|---|
| JP | 3-269706 A | 12/1991 |

(Continued)

OTHER PUBLICATIONS

"International Application Serial No. PCT/JP2010/054179, International Search Report and Written Opinion mailed May 18, 2010", (w/ English Translation of International Search Report), 13 pgs.

(Continued)

*Primary Examiner* — Thomas Tarcza
*Assistant Examiner* — Alex C Dunn
(74) *Attorney, Agent, or Firm* — Schwegman Lundberg & Woessner, P.A.

(57) ABSTRACT

An unmanned conveyance vehicle (11) includes a detecting device (23) that has a plurality of sensing elements (25), first to fourth marker sensors (31-34) arranged on both sides of the sensing elements 25, and a magnetic member (35). The sensing elements (25) detect positions of guide tapes (12, 13) laid down along a road travel surface. The marker sensors (31-34) detect magnetic markers (14A-14D) laid down along the road travel surface. The magnetic member (35) is arranged above the sensing elements (25) and the marker sensors (31-34). When a left end (35a) of the magnetic member (35) moves to a position above the branch guide tape (13), the first marker sensor (31) operates, and the left end (35a) is magnetized to the north pole by the magnetic flux of the branch guide tape (13). A right end (35b) of the magnetic member (35) is magnetized to the south pole to operate the third marker sensor (33). As a result, ON signals are output from the first and third marker sensors (31, 33) to an erroneous determination preventing section (52) of a control unit (22). The erroneous determination preventing section (52) determines the ON signals to be invalid.

5 Claims, 6 Drawing Sheets

U.S. PATENT DOCUMENTS

| | | | |
|---|---|---|---|
| 4,847,774 A * | 7/1989 | Tomikawa et al. | 701/23 |
| 4,864,207 A * | 9/1989 | Miura et al. | 318/587 |
| 5,000,279 A * | 3/1991 | Kondo et al. | 180/168 |
| 5,189,612 A * | 2/1993 | Lemercier et al. | 701/23 |
| 5,191,528 A * | 3/1993 | Yardley et al. | 701/23 |
| 5,204,814 A * | 4/1993 | Noonan et al. | 701/25 |
| 5,216,605 A * | 6/1993 | Yardley et al. | 701/23 |
| 5,347,456 A * | 9/1994 | Zhang et al. | 701/23 |
| 5,883,587 A * | 3/1999 | Ikemoto | 340/988 |
| 5,925,080 A | 7/1999 | Shimbara et al. | |
| 5,988,306 A * | 11/1999 | Ooishi | 180/168 |
| 6,032,110 A * | 2/2000 | Ishihara et al. | 702/150 |
| 6,336,064 B1 * | 1/2002 | Honkura et al. | 701/23 |
| 6,772,062 B2 * | 8/2004 | Lasky et al. | 701/518 |
| 6,971,464 B2 * | 12/2005 | Marino et al. | 180/167 |

FOREIGN PATENT DOCUMENTS

| | | |
|---|---|---|
| JP | 4-306708 A | 10/1992 |
| JP | 8-44430 A | 2/1996 |
| JP | 9-269831 A | 10/1997 |
| JP | 10-111718 A | 4/1998 |
| JP | 10-283030 A | 10/1998 |

OTHER PUBLICATIONS

"Reference No. JP 2008-507261", *Journal of Toyota Shatau Technical Disclosure*, (Dec. 8, 2008), 4 pgs.

"International Application Serial No. PCT/JP2010/054179, International Preliminary Report on Patentability dated Jan. 17, 2012", (w/ English Translation of Written Opinion), 5 pgs.

\* cited by examiner

|   | 31LS | 32LN | 33RS | 34RN | 52D |
|---|------|------|------|------|-----|
| a | ON   | OFF  | OFF  | OFF  | 31 ON |
| b | OFF  | OFF  | ON   | OFF  | 33 ON |
| c | OFF  | ON   | OFF  | OFF  | 32 ON |
| d | OFF  | OFF  | OFF  | ON   | 34 ON |
| e | OFF  | ON   | ON   | OFF  | OFF |
| f | ON   | OFF  | OFF  | ON   | OFF |
| g | OFF  | OFF  | ON   | ON   | OFF |
| h | ON   | ON   | OFF  | OFF  | OFF |

Fig.7

| 31LS (32LN) | 34RN (33RS) | 52D |
|-------------|-------------|-----|
| ON          | OFF         | 31 ON (32 ON) |
| OFF         | ON          | 34 ON (33 ON) |
| ON          | ON          | OFF |

TRAVEL CONTROL DEVICE FOR UNMANNED CONVEYANCE VEHICLE

This application is a nationalization under 35 U.S.C. 371 of PCT/JP2010/054179, filed Mar. 12, 2010 and published as WO 2010/150579 A1 on Dec. 29, 2010, which claimed priority under 35 U.S.C. 119 to Japanese Patent Application No. 2009-152529, filed Jun. 26, 2009; which applications and publication are incorporated herein by reference in their entirety.

TECHNICAL FIELD

The present invention relates to a travel control device for an unmanned conveyance vehicle that travels along a guide tape laid down along a road travel surface, more specifically, to a travel control device for an unmanned conveyance vehicle that can prevent erroneous detection of a marker sensor for detecting a magnetic marker located on a side of the guide tape. The magnetic marker includes various pieces of control information for an unmanned conveyance vehicle.

BACKGROUND OF THE INVENTION

Figure 8:
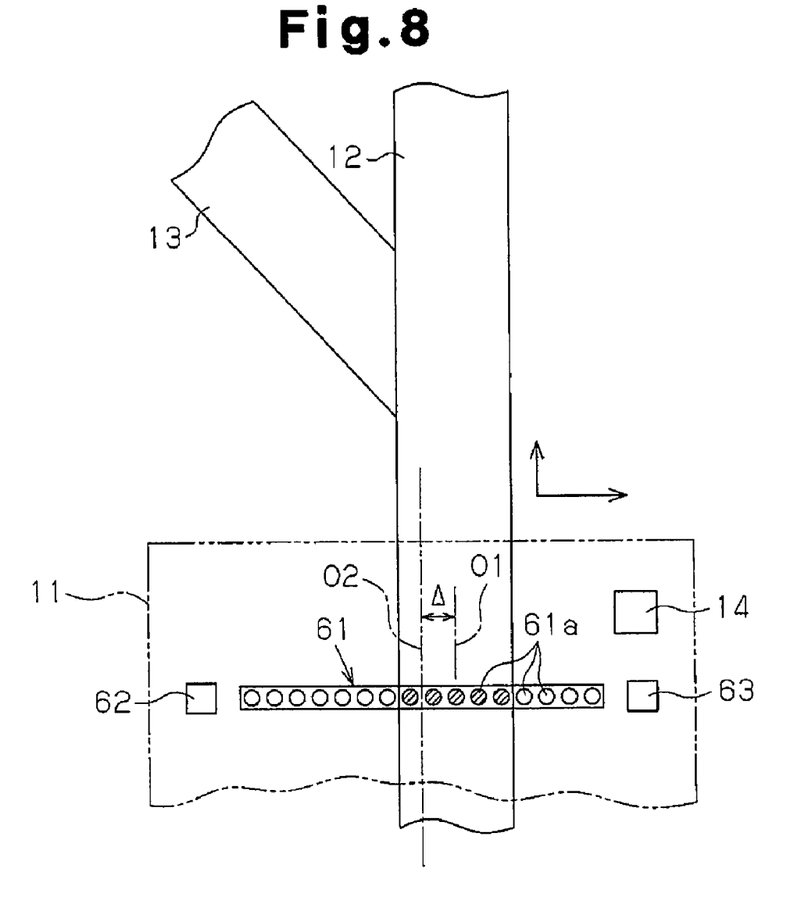
FIG. 8 is a schematic plan view for explanatory illustration of guided travel of a conventional magnetically guided unmanned conveyance vehicle.

As shown in FIG. 8, a main guide tape 12 and a branch guide tape 13 configured by magnetic tapes are laid down along a path on which a magnetically guided unmanned conveyance vehicle 11 travels. The main guide tape 12 guides the unmanned conveyance vehicle 11 onto a main travel track, and the branch guide tape 13 guides the unmanned conveyance vehicle 11 onto a branch travel track. A plurality of magnetic markers 14 for providing various operation instructions (control information) of, for example, a turn, a stop, an acceleration, and a deceleration to the unmanned conveyance vehicle 11 are arranged on the left and right sides of the main guide tape 12. The magnetic markers 14 are also configured by magnetic tapes. The unmanned conveyance vehicle 11 includes a guide sensor 61 configured by a large number of Hall elements 61a for detecting the main guide tape 12 and marker sensors 62 and 63 for detecting the magnetic marker 14. In FIG. 8, an arrow extending along the main guide tape 12 represents a forward travel direction of the unmanned conveyance vehicle 11. An arrow extending in a lateral direction represents the right direction of the unmanned conveyance vehicle 11 in the travel direction.

A control unit (not shown) of the unmanned conveyance vehicle 11 calculates a deviation Δ between the center position O1 of the main guide tape 12 detected by the Hall elements 61a of the guide sensor 61 and the center position O2 of the guide sensor 61, i.e., the vehicle body. The control unit controls a drive device of the unmanned conveyance vehicle 11 such that the deviation Δ becomes zero. In this manner, the unmanned conveyance vehicle 11 is unmanned-guided along the main guide tape 12. When magnetic markers 14 are sequentially detected by the marker sensors 62 and 63 while the unmanned conveyance vehicle 11 travels, the control unit controls the drive device to perform, in the order of detection of the magnetic markers 14, a speed change registered in advance or a course change to the branch guide tape 13 as shown in FIG. 8 (see Patent Document 1).

Figure 9:
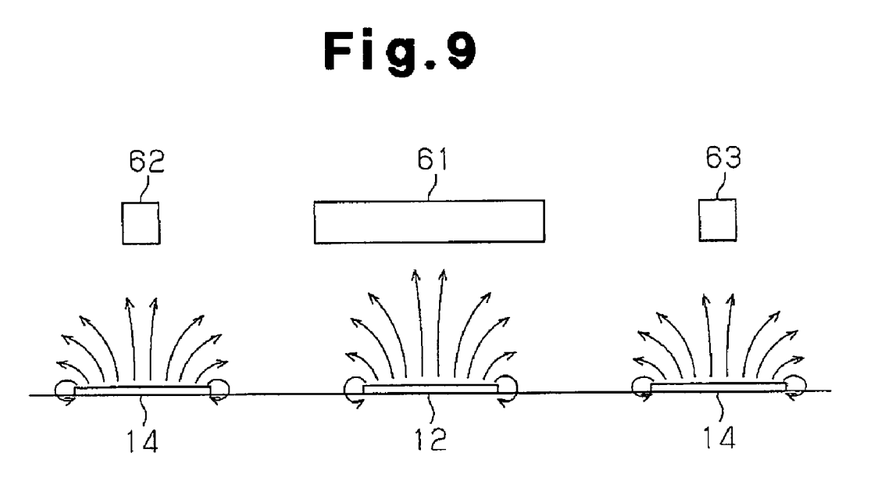
FIG. 9 is a side view showing the intensities of magnetic flux densities of a conventional guide tape and a magnetic marker.

The magnetic forces of the magnetic tapes configuring the guide tapes 12 and 13 and the magnetic markers 14 are in proportion to the sizes of the tapes. For this reason, the magnetic flux density above the magnetic marker 14 that is cut short is smaller than the magnetic flux densities of the guide tapes 12 and 13, as shown in FIG. 9. For this reason, the marker sensors 62 and 63 require detection accuracy higher than that of the guide sensor 61 in order to eliminate erroneous detection.

Figure 10:
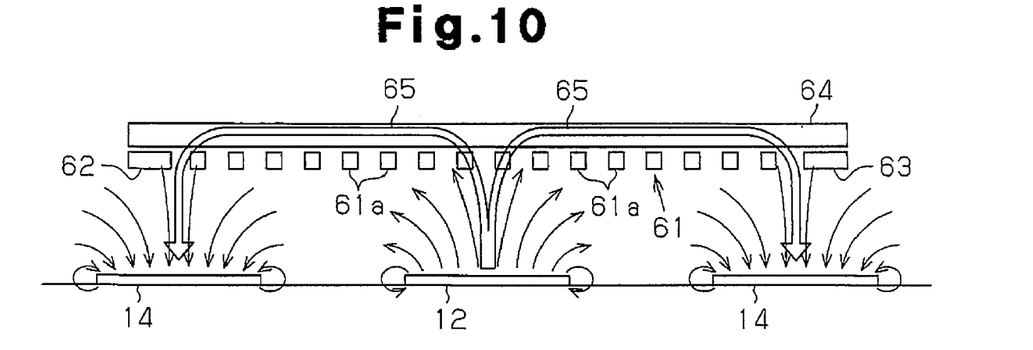
FIG. 10 is a side view for explanatory illustration of an operation of a detecting device including a conventional magnetic member.

In order to solve the above problem, the present applicant has proposed the following magnetic marker detecting device. The magnetic marker detecting device is configured such that, as shown in FIG. 10, a magnetic member 64 is arranged near and above the guide sensor 61 and the marker sensors 62 and 63. The magnetic member 64 is made of iron and has a horizontally long quadratic prismatic shape. The magnetic flux output from the main guide tape 12 is guided to the magnetic member 64, and the magnetic flux is induced from the magnetic member 64 to the magnetic marker 14. In this manner, a new magnetic flux flow 65 is generated. The magnetic flux induction causes strong magnetic fluxes to act on the guide sensor 61 and the marker sensors 62 and 63. This results in an improvement of the detection sensitivity of the main guide tape 12 by the guide sensor 61 and the detection sensitivities of the magnetic markers 14 by the marker sensors 62 and 63 (see Non-patent Document 1).

PRIOR ART DOCUMENTS

Patent Document

Patent Document 1: Japanese Laid-Open Patent Publication No. 10-111718
Non-Patent Document Non-patent Document 1: Journal of Technical Disclosure of Japan Institute of Invention and Innovation (Japan Institute of Invention and Innovation, published Dec. 8, 2008, Technical Disclosure Number: 2008-507261, TOYOTA SHATAI KABUSHIKI KAISHA: Magnetic Tape Detection Sensor Unit for Unmanned Conveyance Vehicle)

SUMMARY OF THE INVENTION

Problem to be Solved by the Invention

Figure 11:
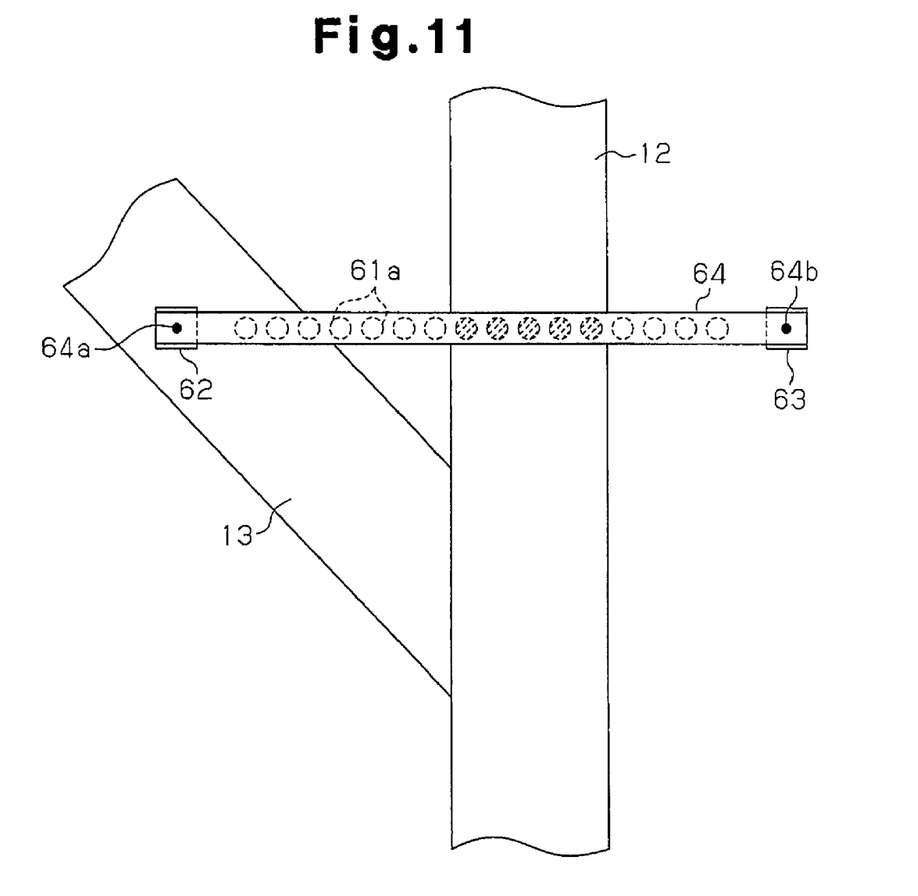
FIG. 11 is a plan view for explanatory illustration of an operation of a conventional detecting device in FIG. 10.

However, the conventional magnetic marker detecting device described above has the following problems. More specifically, when the unmanned conveyance vehicle 11 travels in a straight line along the main guide tape 12 as shown in FIG. 8, the unmanned conveyance vehicle 11 reaches a position as shown in FIG. 11. In this case, the left end 64a of the magnetic member 64 of the marker detecting device is located at a position corresponding to the branch guide tape 13. At this time, due to the magnetic flux of the branch guide tape 13 having the north pole on the upper surface, the left end 64a of the magnetic member 64 is magnetized to the north pole. With the magnetization of the left end 64a, the right end 64b of the magnetic member 64 is magnetized to the south pole. As a result, the marker sensor 63 located at a position corresponding to the south pole of the right end 64b of the magnetic member 64 outputs an ON signal due to the magnetic flux of the magnetic member 64 regardless of the absence of the magnetic marker 14 on the road travel surface. Therefore, an erroneous determination, i.e., a determination that the magnetic marker 14 is present is made, and a failure occurs in a travel control operation of the unmanned conveyance vehicle 11.

Accordingly, it is an objective of the present invention to provide a travel control device for an unmanned conveyance vehicle that is capable of improving the detection accuracy of a marker sensor for detecting a magnetic marker that provides control information, and properly performs a travel control operation.

In order to solve the above problem, according to one aspect of the present invention, there is provided a travel control device for an unmanned conveyance vehicle, including: a first magnetic sensor that is arranged in an unmanned conveyance vehicle to detect a guide tape laid down along a road travel surface; a plurality of second magnetic sensors that are arranged on the left and right sides of the first magnetic sensor to detect magnetic markers laid down along the road travel surface on the sides of the guide tape; a magnetic member that is arranged above the first and second magnetic sensors to improve detection sensitivities of the magnetic sensors; and a control unit adapted to perform guided travel and various operation controls of the unmanned conveyance vehicle on the basis of detection signals from the first and second magnetic sensors. The control unit includes erroneous determination preventing means. When a plurality of detection signals output from the second magnetic sensors include only one ON signal, the erroneous determination preventing means determines the ON signal to be valid, and when the detection signals include a plurality of ON signals, the erroneous determination preventing means determines all the ON signals to be invalid.

The erroneous determination preventing means preferably includes a software filter that determines whether the detection signals include only one ON signal or a plurality of ON signals.

The second magnetic sensors preferably include a pair of left second magnetic sensors arranged on the left side of the first magnetic sensor and a pair of right second magnetic sensors The left second magnetic sensors preferably detect a magnetic marker having the south pole on the upper surface thereof and a magnetic marker having the north pole on the upper surface thereof. The right second magnetic sensors preferably detect a magnetic marker having the south pole on the upper surface thereof and a magnetic marker having the north pole on the upper surface thereof.

Alternatively, the second magnetic sensors preferably include a left second magnetic sensor arranged on the left side of the first magnetic sensor and a right second magnetic sensor arranged on the right side of the first magnetic sensor. The left second magnetic sensor preferably detects a magnetic marker that is laid down along a road travel surface and has the south pole or the north pole on the upper surface thereof, and the right second magnetic sensor preferably detects a magnetic marker that is laid down along the road travel surface and has the north pole or the south pole on the upper surface thereof in order to detect a magnetic polarity different from that detected by the left second magnetic sensor.

The first magnetic sensor is preferably configured by a plurality of sensing elements arranged in a line at predetermined intervals along the widthwise direction of the vehicle body of the unmanned conveyance vehicle. The sensing elements are preferably turned ON when the sensing elements are located above the guide tape, and the control unit preferably includes guide control means that calculates a deviation between an arrangement center in the widthwise direction of the vehicle body of a predetermined number of sensing elements that have been turned ON by the guide tape and a center position of the vehicle body, thereby causing the vehicle body to unmanned-travel along the guide tape in such a manner as to cancel the deviation.

When the second magnetic sensor is located at a position corresponding to a magnetic marker arranged on the road travel surface while the unmanned conveyance vehicle travels in a straight line along the guide tape, an ON signal is transmitted from the second magnetic sensor to the control unit. The erroneous determination preventing means of the control unit determines the ON signal to be valid when a plurality of detection signals output from the second magnetic sensors include only one ON signal.

When, while the unmanned conveyance vehicle is traveling in a straight line along the guide tape, a left end of the magnetic member is located at a position corresponding to, for example, the branch guide tape, the left end of the magnetic member is magnetized to the north pole by the magnetic flux generated by, for example, the north pole of the guide tape. Accordingly, the right end of the magnetic member is magnetized to the south pole. For this reason, the left second magnetic sensor of the second magnetic sensors arranged on the left and right sides of the first magnetic sensor outputs an ON signal serving as a detection signal by means of the magnetic flux at the north pole of the branch guide tape. The right second magnetic sensor outputs an ON signal serving as a detection signal by means of the magnetic flux at the south pole of the right end of the magnetic member regardless of the absence of an actual magnetic marker on the road travel surface. In this manner, when ON signals are transmitted to the control unit, all the ON signals are determined to be invalid by the erroneous determination preventing section. This prevents an erroneous determination of the marker sensor.

Effect of the Invention

According to the present invention, it is possible to improve the detection accuracy of a marker sensor that detects a magnetic marker instructing control information for an unmanned conveyance vehicle and also to properly perform a travel control operation of an unmanned conveyance vehicle.

DETAILED DESCRIPTION OF THE PREFERRED EMBODIMENTS

A travel control device for an unmanned conveyance vehicle according to one embodiment of the present invention will now be described with reference to FIGS. 1 to 6.

Figure 2:
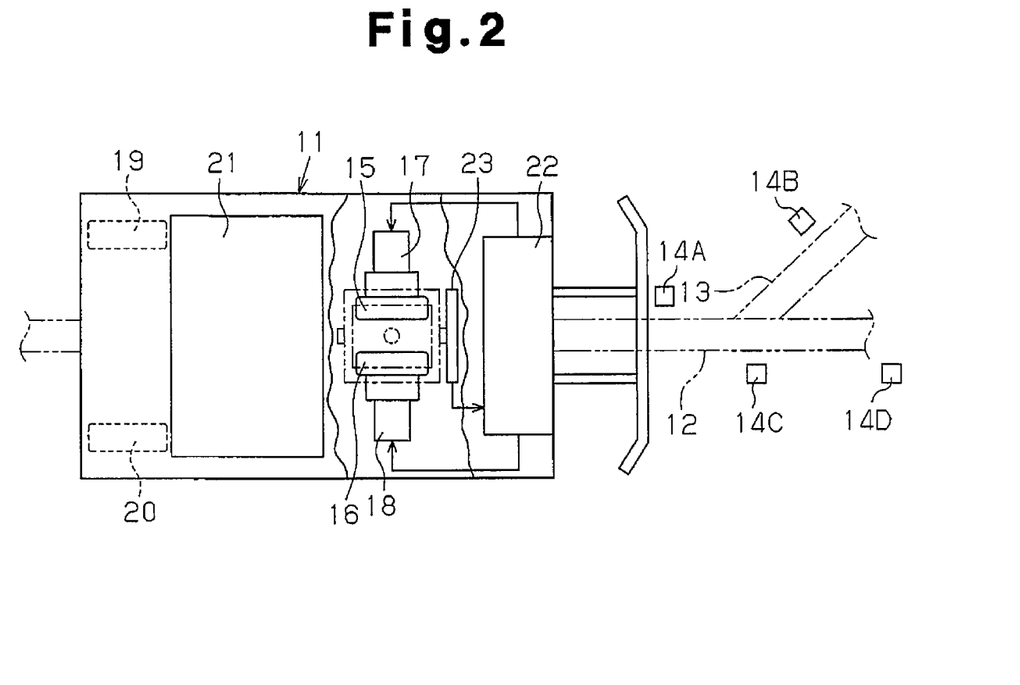
FIG. 2 is a partially cutaway schematic plan view showing an unmanned conveyance vehicle according to one embodiment.

As shown in FIG. 2, the unmanned conveyance vehicle 11 travels along a travel route set in a factory in advance and performs automatic conveyance of machine parts. On the travel route, a main guide tape 12 having a predetermined width (for example, 5 cm) is laid down. A branch guide tape 13 having a predetermined width (for example, 5 cm) is laid down to obliquely intersect the main guide tape 12. The main guide tape 12 and the branch guide tape 13 are configured by magnetic tapes. Each of the main guide tape 12 and the branch guide tape 13 has the north pole on the upper surface and the south pole on the bottom surface to generate a magnetic flux directed from the north pole to the south pole. On the sides of the main guide tape 12 and the branch guide tape 13 on the travel route, a plurality of first to fourth magnetic markers 14A to 14D to give instructions of various pieces of control information to the unmanned conveyance vehicle 11 are laid down. Each of the first to fourth magnetic markers 14A to 14D is configured by a magnetic tape. Each of the first to fourth magnetic markers 14A to 14D has the south pole on the upper surface and the north pole on the bottom surface to generate a magnetic flux directed from the north pole to the south pole. Each of the first to fourth magnetic markers 14A to 14D includes various pieces of information such as a course change, a speed change, and a stop as instructions to the unmanned conveyance vehicle 11.

Figure 3:
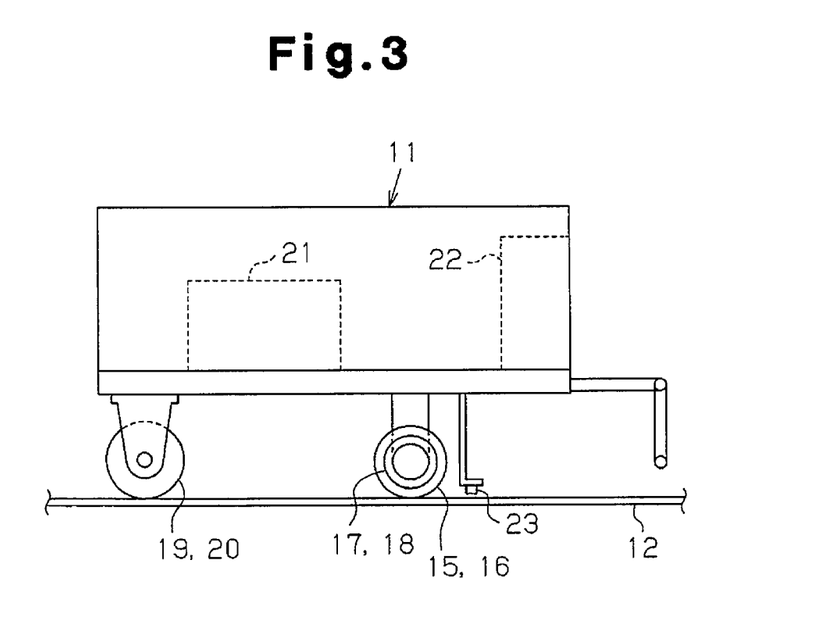
FIG. 3 is a schematic right side view showing the unmanned conveyance vehicle in FIG. 2.

As shown in FIGS. 2 and 3, on a lower part of the vehicle body of the unmanned conveyance vehicle 11, a pair of left and right front wheels 15 and 16 are provided. The wheels 15 and 16 can be independently driven by the electric motors 17 and 18, respectively. On the lower part of the vehicle body, a pair of left and right coasting wheels 19 and 20 are arranged to be located at the rear of the front wheels 15 and 16, respectively. In the vehicle body, a battery 21 serving as driving energy and a control unit 22 that controls various operations of the unmanned conveyance vehicle 11 are arranged.

Figure 1:
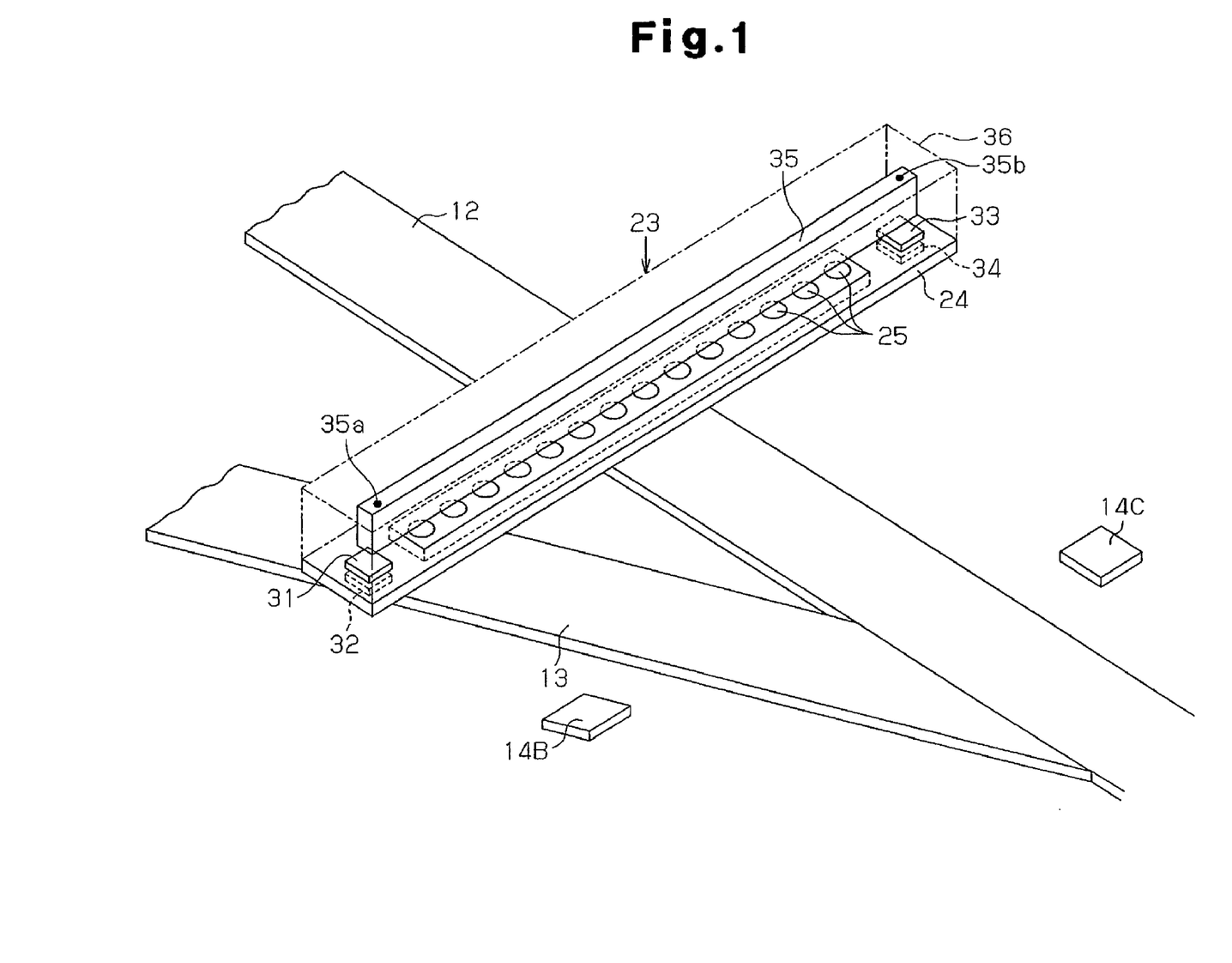
FIG. 1 is an enlarged perspective view showing a guide tape and a magnetic marker detecting device for use in a travel control device for an unmanned conveyance vehicle according to the present invention.
Figure 5:
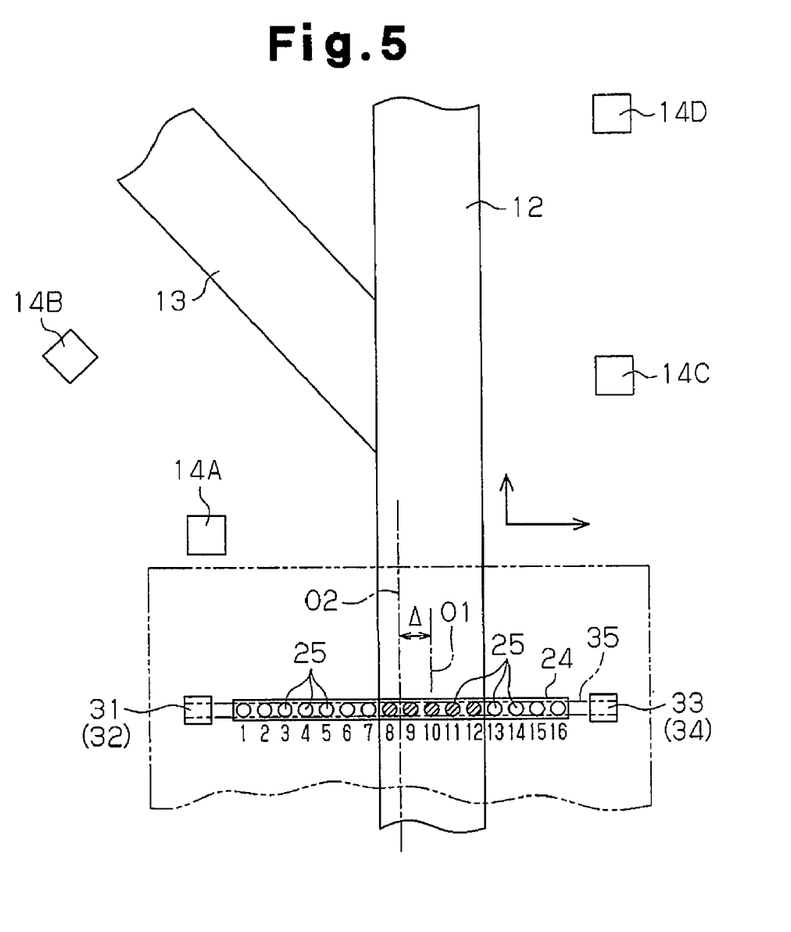
FIG. 5 is a plan view for explanatory illustration of a travel control operation of the unmanned conveyance vehicle in FIG. 2.

A detecting device 23 is arranged on a front side of the unmanned conveyance vehicle 11. The detecting device 23 detects an installation position of the guide tape 12 (13), the magnetic polarities of the upper surfaces of the first to fourth magnetic markers 14A to 14D, and control information. The detecting device 23, as shown in FIGS. 1 and 5, includes a belt-like attaching board 24 extending along the widthwise direction of the unmanned conveyance vehicle 11 and a plurality of (for example, sixteen) sensing elements 25 arranged on the attaching board 24 at predetermined intervals. The attaching board 24 is made of a non-magnetic material such as a synthetic resin. The sensing elements 25 are arranged along the widthwise direction of the unmanned conveyance vehicle 11, i.e., a direction intersecting the travel direction of the unmanned conveyance vehicle. Each of the sensing elements 25 is configured by a Hall element and functions as a first magnetic sensor. Of the sensing elements 25, a predetermined number (for example, five) of sensing elements 25 are arranged so as to correspond to the guide tape 12 (13). The predetermined number of sensing elements 25 located at the position corresponding to the guide tape 12 (13) are turned on, and detection signals from those sensing elements 25 are output to the control unit 22. In FIG. 5, an arrow extending along the main guide tape 12 expresses a forward traveling direction of the unmanned conveyance vehicle 11. An arrow extending in a lateral direction expresses the right direction of the unmanned conveyance vehicle 11 in the travel direction.

First to fourth marker sensors 31 to 34 serving as second magnetic sensors for detecting the first to fourth magnetic markers 14A to 14D are arranged on the left and right ends of the attaching board 24. The first marker sensor 31 and the third marker sensor 33 are arranged on the upper surface of the attaching board 24, and the second marker sensor 32 and the fourth marker sensor 34 are arranged on the bottom surface of the attaching board 24. The first to fourth marker sensors 31 to 34 are respectively configured by Hall elements. The first marker sensor 31, which detects the south pole, detects the first or second magnetic marker 14A or 14B having the south pole on the upper surface. The second marker sensor 32, which detects the north pole, reacts with the main guide tape 12 or the branch guide tape 13 having the north pole on, for example, the upper surface. The third marker sensor 33, which detects the south pole, detects the third magnetic marker 14C or the fourth magnetic marker 14D having the south pole on, for example, the upper surface. The fourth marker sensor 34, which detects the north pole, reacts with the main guide tape 12 having the north pole on, for example, the upper surface or the branch guide tape 13 (not shown) for right turn. Detection signals (ON signals or OFF signals) detected by the first to fourth marker sensors 31 to 34 are transmitted to the control unit 22.

On the attaching board 24, through a bracket (not shown), a magnetic member 35 is arranged near and above the sensing elements 25 and the first and third marker sensors 31 and 33. The magnetic member 35 is made of, for example, iron and has a horizontally long quadratic prismatic shape. As described in the BACKGROUND ART section with reference to FIG. 10, the magnetic member 35 improves the detection sensitivity of the sensing elements 25, which detects the main guide tape 12, and the detection sensitivities to the first to fourth magnetic markers 14A to 14D by the first and third marker sensors 31 and 33, which detect the south pole. To the attaching board 24, a synthetic resin cover 36 is attached so as to cover the sensing elements 25, the first to fourth marker sensors 31 to 34, and the magnetic member 35.

Figure 4:
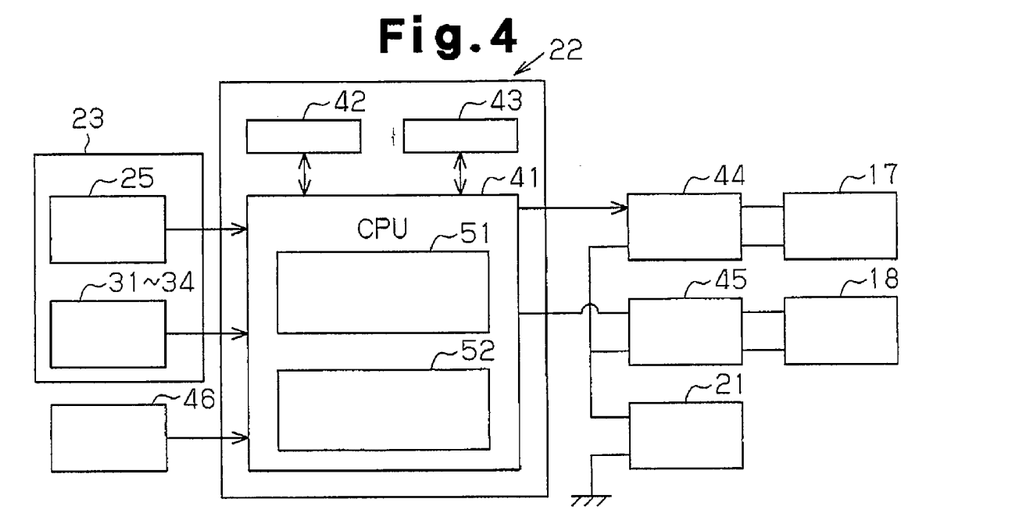
FIG. 4 is a block circuit diagram showing the travel control system for the unmanned conveyance vehicle in FIG. 2.

With reference to FIG. 4, the configuration and functions of the control unit 22 will be described below.

As shown in FIG. 4, the control unit 22 includes a central processing unit (CPU) 41 that performs various arithmetic operations and determining operations on the basis of various data. A read-only memory (ROM) 42, from which data is only read, and a random access memory (RAM) 43 are connected to the CPU 41. In the read-only memory (ROM) 42, data such as a program to perform a drive control operation for the unmanned conveyance vehicle 11 is stored in advance. Various data can be written in or read from the RAM 43. The electric motor 17 is connected to the CPU 41 via a drive circuit 44 operated by the battery 21, and the electric motor 18 is connected to the CPU 41 via a drive circuit 45. Detection signals detected by the sensing elements 25 and the first to fourth marker sensors 31 to 34 are input to the CPU 41. A console panel 46 having a keyboard to input various data is connected to the CPU 41.

The CPU 41 includes a guide control section 51 and an erroneous determination preventing section 52. The guide control section 51 controls the electric motors 17 and 18 on the basis of the detection signals transmitted from the sensing elements 25 to guide the unmanned conveyance vehicle such that the unmanned conveyance vehicle travels along the main guide tape 12. The erroneous determination preventing section 52 prevents erroneous determinations of the first to fourth marker sensors 31 to 34 on the basis of the detection signals transmitted from the first to fourth marker sensors 31 to 34, i.e., all the detection signals from the magnetic markers 14A to 14D. The erroneous determination preventing section 52 is configured by a software filter. When only one detection signal of the four detection signals from the first to fourth marker sensors 31 to 34 is an ON signal, and the other remaining detection signals are OFF signals, the erroneous determination preventing section 52 determines the ON signal to be valid. In contrast to this, when a plurality of ON signals are included in the four detection signals, the erroneous determination preventing section 52 determines all the ON signals to be invalid. In this manner, the erroneous determination preventing section 52 has a function of preventing erroneous determinations of the detection signals from the magnetic markers 14A to 14D.

Figure 6:
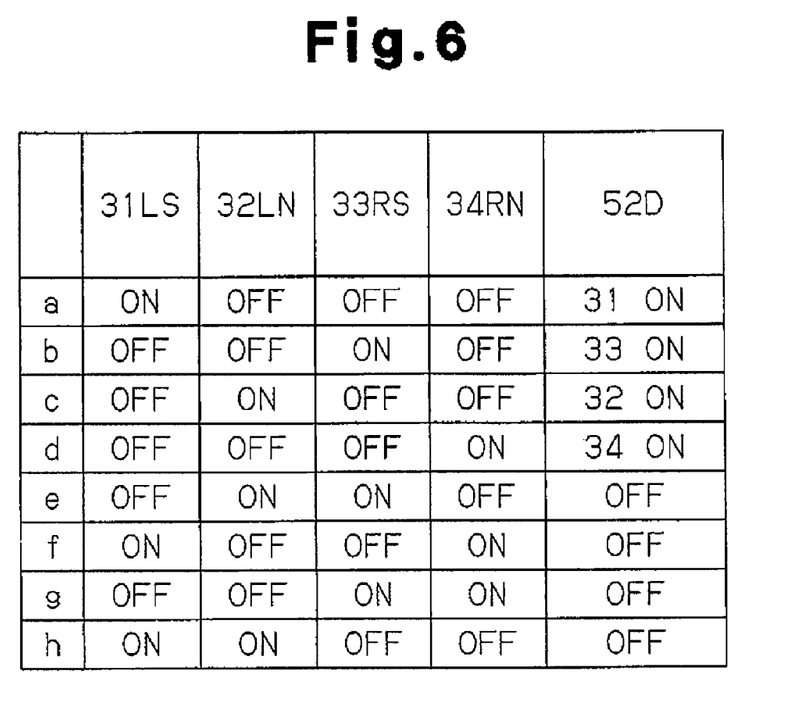
FIG. 6 is a table for explanatory illustration of a determination of pass or fail of a detection operation of a marker sensor.

The erroneous determination preventing section 52 determines the validity of the detection signals from the first to fourth marker sensors 31 to 34 as shown in the table in FIG. 6. A column 31LS expresses a detection signal from the first marker sensor 31 for detecting the south pole on the left. A column 32LN expresses a detection signal from the second marker sensor 32 for detecting the north pole on the left. A column 33RS expresses a detection signal from the third marker sensor 33 for detecting the south pole on the right. A column 34RN expresses a detection signal from the fourth marker sensor 34 for detecting the north pole on the right. A column 52D expresses a determination result of the erroneous determination preventing section 52.

An operation of the unmanned conveyance vehicle 11 configured as described above will be described below.

As shown in FIG. 5, while the unmanned conveyance vehicle 11 travels along the main guide tape 12 arranged on a travel route, detection signals detected by the sensing elements 25 are transmitted to the guide control section 51 of the CPU 41 of the control unit 22. The unmanned conveyance vehicle 11 is controlled as follows by the guide control section 51. Weighting indexes from 1 to 16 are set for sixteen Hall elements of the sensing elements 25, respectively. By using the total sum of the weighting indexes of a predetermined number of ON sensing elements 25, the arrangement center of the predetermined number of ON sensing elements 25 in the widthwise direction of the vehicle body, i.e., the center position O1 of the main guide tape 12 is calculated. The deviation Δ between the center position O1 and the center position O2 of the unmanned conveyance vehicle 11 is calculated. On the basis of the calculated deviation Δ, the deceleration rate of one of the front wheels 15 and 16 is set to decelerate the unmanned conveyance vehicle 11. In this manner, a traveling direction of the unmanned conveyance vehicle 11 is corrected such that the deviation Δ becomes zero, so that automatic travel of the unmanned conveyance vehicle 11 is controlled along the main guide tape 12.

When the unmanned conveyance vehicle 11 runs along the main guide tape 12, as shown in FIG. 2, the unmanned conveyance vehicle 11 comes close to the first magnetic marker 14A before the branch guide tape 13 branching from the main guide tape 12. When the first magnetic marker 14A is detected by the first marker sensor 31 of the detecting device 23, the detection signal from the first marker sensor 31 is transmitted to the erroneous determination preventing section 52 of the control unit 22. At this time, as indicated by a row a in FIG. 6, the detection signal output from the first marker sensor 31 is an ON signal. Since the second to fourth magnetic markers 14B, 14C, and 14D are not detected by the second to fourth marker sensors 32 to 34, OFF signals are input from the second to fourth marker sensors 32 to 34 to the erroneous determination preventing section 52. For this reason, since only the detection signal from the first marker sensor 31 of the four first to fourth marker sensors 31 to 34 is an ON signal, the erroneous determination preventing section 52 determines the ON signal from the first marker sensor 31 to be a valid signal. In this manner, the first magnetic marker 14A is correctly detected by the first marker sensor 31. On the basis of control information (for example, left turn) of the first magnetic marker 14A, the unmanned conveyance vehicle 11 is controlled, for example, turned to the left.

When only the third magnetic marker 14C is detected by the third marker sensor 33, only a detection signal from the third marker sensor 33 is an ON signal, and detection signals from the first, second, and fourth marker sensors 31, 32, and 34 are OFF signals. Also in this case, as indicated by a row b in FIG. 6, the erroneous determination preventing section 52 determines the ON signal from the third marker sensor 33 to be a valid signal. On the basis of control information (for example, acceleration) stored in the third magnetic marker 14C in advance, the unmanned conveyance vehicle 11 is controlled, for example, accelerated.

Rows c and d in FIG. 6 denote determining operations performed when magnetic markers (not shown) each having the north pole on the upper surface are arranged on the road travel surface on the left and right sides of the main guide tape 12. As indicated by rows c and d in FIG. 6, when only a detection signal from the second marker sensor 32 is an ON signal, or when only a detection signal from the fourth marker sensor 34 is an ON signal, the erroneous determination preventing section 52 determines the ON signal from the second or fourth marker sensor 32 or 34 to be a valid signal. On the basis of control information of the second magnetic marker 14B or the fourth magnetic marker 14D, for example, the unmanned conveyance vehicle 11 is controlled, for example, turned to the right or stopped.

Next, a description will be made as to a detection operation performed when the unmanned conveyance vehicle 11 travels in a straight line along the main guide tape 12 and when the left end 35a of the magnetic member 35 of the detecting device 23 is located at a position corresponding to a position above the branch guide tape 13 branching to the left, as shown in FIG. 1.

As shown in FIG. 1, in a state in which the left end 35a of the magnetic member 35 is located at a position corresponding to a position above the branch guide tape 13, only the left end 35a of the magnetic member 35 is located at a position corresponding to the branch guide tape 13 having the north pole on the upper surface. For this reason, the second marker sensor 32 outputs an ON signal as a detection signal to the erroneous determination preventing section 52. The left end 35a of the magnetic member 35 is magnetized to the north pole. Accordingly, a right end 35b of the magnetic member 35 is magnetized to the south pole, and a magnetic flux is generated at the right end 35b. Therefore, even though the third or fourth magnetic marker 14C or 14D having the south pole on the upper surface is not present on the right side of the main guide tape 12, the magnetic flux at the right end 35b of the magnetic member 35 magnetized to the south pole is detected by the third marker sensor 33. An ON signal serving as a detection signal is transmitted from the third marker sensor 33 to the erroneous determination preventing section 52 of the CPU 41. As indicated by a row e in FIG. 6, ON signals are output from two sensors 32 and 33 of the first to fourth marker sensors 31 to 34. In this state, the erroneous determination preventing section 52 determines the two ON signals to be invalid. More specifically, the erroneous determination preventing section 52 determines all the detection signals from the first to fourth marker sensors 31 to 34 to be OFF signals. Therefore, none of the magnetic markers 14A to 14D is detected by any of the first to fourth marker sensors 31 to 34, so that an erroneous determination is avoided. As a result, travel control of the unmanned conveyance vehicle 11 is properly performed.

As indicated by rows f, g, and h in FIG. 6, even though two ON signals are transmitted from the first to fourth marker sensors 31 to 34 to the erroneous determination preventing section 52, as in the above operation, the erroneous determination preventing section 52 determines the two ON signals to be invalid. Therefore, none of the magnetic markers 14A to 14D is detected by any of the first to fourth marker sensors 31 to 34, so that an erroneous determination is avoided.

According to the travel control device for the unmanned conveyance vehicle 11 according to the above embodiment, the following advantages are obtained.

(1) In the above embodiment, ON signals serving as detection signals from the first to fourth marker sensors 31 to 34 of the detecting device 23 shown in FIG. 1 are transmitted to the erroneous determination preventing section 52 of the CPU 41 of the control unit 22. When only one ON signal is input to the erroneous determination preventing section 52, the erroneous determination preventing section 52 determines the ON signal to be valid. When a plurality of ON signals are input to the erroneous determination preventing section 52, the erroneous determination preventing section 52 determines all the ON signals to be invalid. For this reason, even though the left end 35a or the right end 35b of the magnetic member 35 arranged in the detecting device 23 is magnetized by any factor, erroneous determinations of the first to fourth marker sensors 31 to 34 are avoided. More specifically, when any one of the first to fourth marker sensors 31 to 34 is operated by influence of magnetic forces of the magnetic markers 14A to 14D to output ON signals, two ON signals are input to the erroneous determination preventing section 52. Since the erroneous determination preventing section 52 determines these ON signals to be invalid, erroneous determinations of the magnetic markers 14A to 14D can be prevented. As a result, travel control for the unmanned conveyance vehicle 11 can be properly performed.

(2) In the above embodiment, since the erroneous determination preventing section 52 is configured by a software filter, the erroneous determination preventing section 52 can be easily configured without modifying hardware of the unmanned conveyance vehicle 11.

(3) In the above embodiment, the first to fourth marker sensors 31 to 34 for detecting a left south pole, a left north pole, a right south pole, and a right north pole are arranged on the left and right sides of the sensing elements 25 of the detecting device 23. For this reason, as shown in FIG. 6, various combinations that cause an erroneous determination can be properly handled, and accuracy at which an erroneous detection is prevented can be improved.

The above embodiment may be modified as follows.

Figure 7:
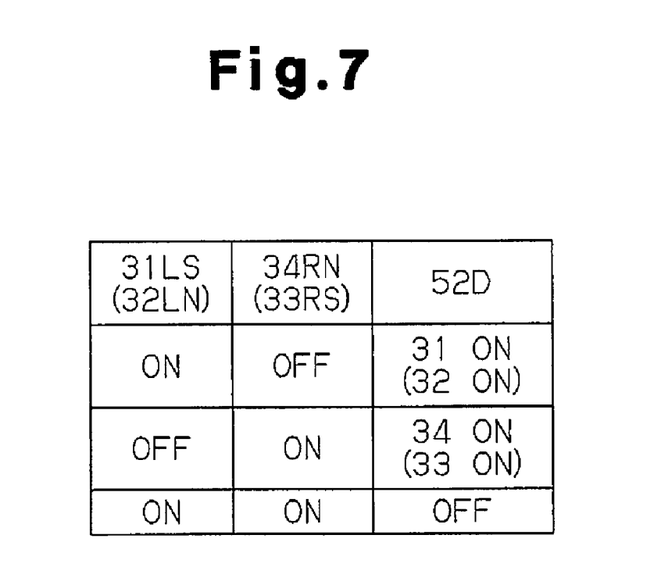
FIG. 7 is a table showing another embodiment of the present invention for explanatory illustration of a determination of pass or fail of a detection operation of a marker sensor.

Only two marker sensors of the first to fourth marker sensors 31 to 34 may be provided in the detecting device 23. In such a case, a marker sensor that detects the magnetic marker 14 having the south pole or the north pole on the upper surface is arranged on the left in the sensing elements 25, and a marker sensor that detects the magnetic marker 14 having the north pole or the south pole on the upper surface is arranged on the right in the sensing elements 25. For example, in the above embodiment, the second and third marker sensors 32 and 33 may be omitted. Alternatively, in the above embodiment, the first and fourth marker sensors 31 and 34 may be omitted. In such cases, as shown in the table in FIG. 7, the erroneous determination preventing section 52 determines the validity of the detection signals on the basis of a detection signal 31LS (34LN) from the left marker sensor and a detection signal 32RN (33RN) from the right marker sensor. When the output signals from the two marker sensors 31 and 34 (32 and 33) include only one ON signal, the erroneous determination preventing section 52 determines ON signals from the marker sensors 31 and 34 (32 and 33) to be valid. More specifically, the detection signal from the left marker sensor 31 (32) is determined as an ON signal. The detection signal from the right marker sensor 34 (33) is determined as an ON signal. When the output signals from the two marker sensors 31 and 34 (32 and 33) are ON signals, the erroneous determination preventing section 52 determines the ON signals to be invalid. For this reason, erroneous determinations by the marker sensors 31 and 34 (32 and 33) are prevented.

In place of the erroneous determination preventing section 52 configured by the software filter, for example, another configuration, such as a hardware filter, may be employed.

The invention claimed is:

1. A travel control device for an unmanned conveyance vehicle, comprising:
   a first magnetic sensor that is arranged in an unmanned conveyance vehicle to detect a guide tape laid down along a road travel surface;
   a plurality of second magnetic sensors that are arranged on left and right sides of the first magnetic sensor to detect magnetic markers laid down along the road travel surface on the sides of the guide tape;
   a magnetic member that is arranged above the first and second magnetic sensors to improve detection sensitivities of the magnetic sensors; and
   a control unit that performs guided travel and various operation controls of the unmanned conveyance vehicle on the basis of detection signals from the first and second magnetic sensors,
   wherein the control unit includes erroneous determination preventing means, wherein, when a plurality of detection signals output from the second magnetic sensors include only one ON signal, the erroneous determination preventing means determines the ON signal to be valid, and when the detection signals include a plurality of ON signals, the erroneous determination preventing means determines all the ON signals to be invalid.

2. The travel control device for an unmanned conveyance vehicle according to claim 1, wherein the erroneous determination preventing means includes a software filter that determines whether the detection signals include only one ON signal or a plurality of ON signals.

3. The travel control device for an unmanned conveyance vehicle according to claim 1, wherein the second magnetic sensors include a pair of left second magnetic sensors arranged on the left side of the first magnetic sensor and a pair of right second magnetic sensors arranged on the right side of the first magnetic sensor, the left second magnetic sensors detecting a magnetic marker having the south pole on the upper surface thereof and a magnetic marker having the north pole on the upper surface thereof, and the right second magnetic sensors detecting a magnetic marker having the south pole on the upper surface thereof and a magnetic marker having the north pole on the upper surface thereof.

4. The travel control device for an unmanned conveyance vehicle according to claim 1, wherein the second magnetic sensors include a left second magnetic sensor arranged on the left side of the first magnetic sensor and a right second magnetic sensor arranged on the right side of the first magnetic sensor, the left second magnetic sensor detecting a magnetic marker that is laid down along a road travel surface and has the south pole or the north pole on the upper surface thereof, and the right second magnetic sensor detecting a magnetic marker that is laid down along the road travel surface and has the north pole or the south pole on the upper surface thereof in order to detect a magnetic polarity different from that detected by the left second magnetic sensor.

5. The travel control device for an unmanned conveyance vehicle according to claim 1, wherein the first magnetic sensor is configured by a plurality of sensing elements arranged in a line at predetermined intervals along the widthwise direction of the vehicle body of the unmanned conveyance vehicle, the sensing elements being turned ON when the sensing elements are located above the guide tape, and the control unit including guide control means that calculates a deviation between an arrangement center in the widthwise direction of the vehicle body of a predetermined number of sensing elements that have been turned ON by the guide tape and a center position of the vehicle body, thereby causing the vehicle body to travel unmanned along the guide tape in such a manner as to cancel the deviation.

* * * * *